United States Patent
Fu et al.

(10) Patent No.: US 10,818,030 B2
(45) Date of Patent: Oct. 27, 2020

(54) THREE-DIMENSIONAL MEASUREMENT APPARATUS AND THREE-DIMENSIONAL MEASUREMENT METHOD

(71) Applicant: OMRON Corporation, Kyoto-shi, Kyoto (JP)

(72) Inventors: Xingdou Fu, Kyoto (JP); Masaki Suwa, Kyoto (JP); Yuki Hasegawa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/357,401

(22) Filed: Mar. 19, 2019

(65) Prior Publication Data

US 2019/0213753 A1  Jul. 11, 2019

Related U.S. Application Data

(63) Continuation of application No. PCT/JP2017/034218, filed on Sep. 22, 2017.

(30) Foreign Application Priority Data

Oct. 14, 2016  (JP) .................. 2016-202682

(51) Int. Cl.
*G06T 7/73* (2017.01)
*G06T 7/00* (2017.01)
(Continued)

(52) U.S. Cl.
CPC .............. *G06T 7/73* (2017.01); *G01B 11/254* (2013.01); *G01B 11/2513* (2013.01);
(Continued)

(58) Field of Classification Search
None
See application file for complete search history.

(56) References Cited

U.S. PATENT DOCUMENTS 6,512,385 B1 * 1/2003 Pfaff .................... G01R 15/241
324/754.23
8,090,194 B2 1/2012 Golrdon et al.
(Continued)

FOREIGN PATENT DOCUMENTS

CN    1654922 A    8/2005
CN    101063605 A    10/2007
(Continued)

OTHER PUBLICATIONS

Will et al., "A Preprocessing Technique for Robot and Machine Vision", Computer and Artificial Intelligence, Session No. 3, Scene Analysis II, 1971, pp. 66-70. (Year: 1971).*
(Continued)

*Primary Examiner* — Reza Aghevli
(74) *Attorney, Agent, or Firm* — Metrolex IP Law Group, PLLC

(57) ABSTRACT

A three-dimensional measurement apparatus includes: projecting means for projecting, onto a measurement target, patterned light having a two-dimensionally coded pattern in which a plurality of types of words each having a different two-dimensional structure and being distinguishable from each other are two-dimensionally arranged; capturing means for capturing the measurement target onto which the patterned light is projected; and calculating means for calculating a three-dimensional position of a target pixel of the image from an image captured by the capturing means, and the two-dimensionally coded pattern is two-fold symmetrical. The two-dimensionally coded pattern is a pattern in which a predetermined word is repeated in the column direction for each column.

14 Claims, 9 Drawing Sheets

(51) Int. Cl.
  *G06T 7/60* (2017.01)
  *G06T 7/521* (2017.01)
  *G01B 11/25* (2006.01)
  *G06K 7/14* (2006.01)

(52) U.S. Cl.
  CPC ............ *G06K 7/1417* (2013.01); *G06T 7/00* (2013.01); *G06T 7/521* (2017.01); *G06T 7/60* (2013.01); *G06T 2207/30208* (2013.01)

(56) References Cited

U.S. PATENT DOCUMENTS

| | | | | |
|---|---|---|---|---|
| 8,199,335 | B2* | 6/2012 | Mitsumoto | G01B 11/2509 356/601 |
| 8,908,016 | B2* | 12/2014 | Gordon | G01B 11/2509 348/49 |
| 9,501,833 | B2* | 11/2016 | Gordon | G06T 7/521 |
| 9,709,387 | B2* | 7/2017 | Fujita | G01C 3/08 |
| 10,330,606 | B2* | 6/2019 | Van Voorst | G01N 21/293 |
| 2003/0067312 | A1* | 4/2003 | Pfaff | G01R 31/311 324/754.23 |
| 2005/0007487 | A1 | 1/2005 | Miyoshi et al. | |
| 2005/0068544 | A1 | 3/2005 | Doemens et al. | |
| 2005/0275848 | A1* | 12/2005 | Hill | G01B 9/02042 356/512 |
| 2011/0181704 | A1 | 7/2011 | Gordon et al. | |
| 2012/0033215 | A1 | 2/2012 | Kandel et al. | |
| 2015/0055853 | A1* | 2/2015 | Gordon | G01B 11/2509 382/154 |
| 2015/0204657 | A1* | 7/2015 | Fujita | G01B 11/2513 348/135 |
| 2015/0253123 | A1 | 9/2015 | Braker et al. | |
| 2015/0371127 | A1 | 12/2015 | Nash et al. | |
| 2016/0167672 | A1* | 6/2016 | Krueger | A61B 5/7282 340/576 |
| 2016/0335472 | A1* | 11/2016 | Lee | G06K 9/00046 |
| 2017/0119281 | A1* | 5/2017 | Herrmann | A61B 5/0082 |
| 2017/0119316 | A1* | 5/2017 | Herrmann | A61B 5/0071 |
| 2017/0119472 | A1* | 5/2017 | Herrmann | A61B 34/10 |
| 2020/0042847 | A1* | 2/2020 | Kato | G06K 19/06037 |

FOREIGN PATENT DOCUMENTS

| | | |
|---|---|---|
| CN | 101089551 A | 12/2007 |
| CN | 103090819 A | 5/2013 |
| CN | 104813141 A | 7/2015 |
| JP | H06-249631 A | 9/1994 |
| JP | 2004-212385 A | 7/2004 |
| JP | 2008-032609 A | 2/2008 |
| JP | 2013-534314 A | 9/2013 |
| WO | 2014/080937 A1 | 5/2014 |
| WO | 2015/195309 A1 | 12/2015 |

OTHER PUBLICATIONS

Salvi J. et al., "Pattern codification strategies in structured light systems", Pattern Recognition, Apr. 1, 2004, pp. 827-849, vol. 37, No. 4, Elsevier; Relevance is indicated in the extended European search report dated Nov. 13, 2019.

The extended European search report dated Nov. 13, 2019 in a counterpart European patent application.

P. Vuylsteke et al. "Range Image Acquisition with a Single Binary-Encoded Light Pattern", IEEE Transactions on Pattern Analysis and Machine Intelligence, Feb. 1990, pp. 148-164, vol. 12, No. 2, IEEE, Concise explanation of relevance provided in the specification.

Hiroshi Kawasaki et al. "Single Color One-shot Scan using Topology Information", Computer Vision ECCV 2012, Workshops and Demonstrations, DOI 10.1007/978-3-642-33885-4_49, Concise explanation of relevance provided in the specification.

An English translation of the International Search Report of PCT/JP2017/034218 dated Dec. 19, 2017.

An English translation of the Written Opinion of PCT/JP2017/034218 dated Dec. 19, 2017.

The Office Action dated Apr. 22, 2020 in a counterpart Chinese patent application.

* cited by examiner

FIG. 3A  "PRIMITIVE" IS CONSTITUTED BY ONE "BIT" AND FOUR "GRIDS".
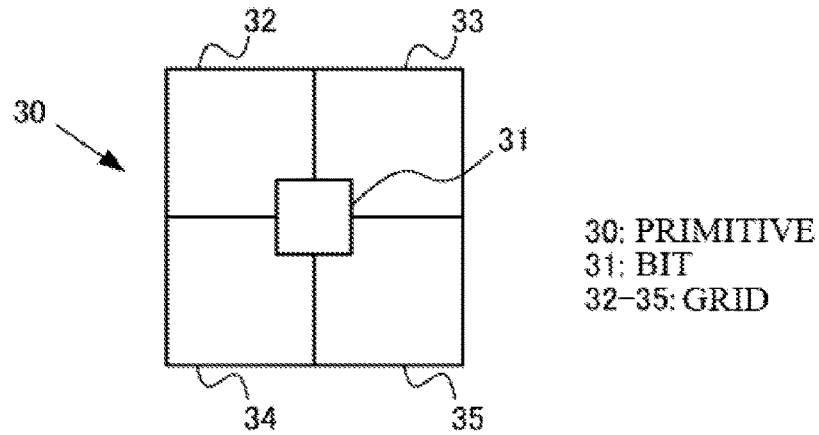
30: PRIMITIVE
31: BIT
32-35: GRID
FIG. 3B  "BIT" SHOWS 0 OR 1
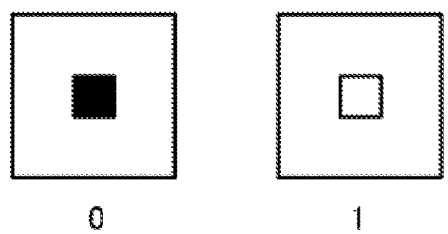
FIG. 3C  "GRID" SHOWS SIGNS (+ OR -).
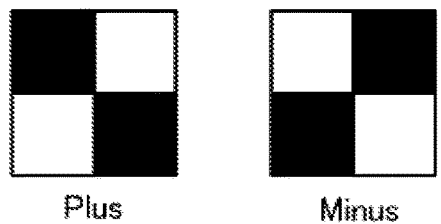
FIG. 3D  FOUR TYPES OF PRIMITIVES
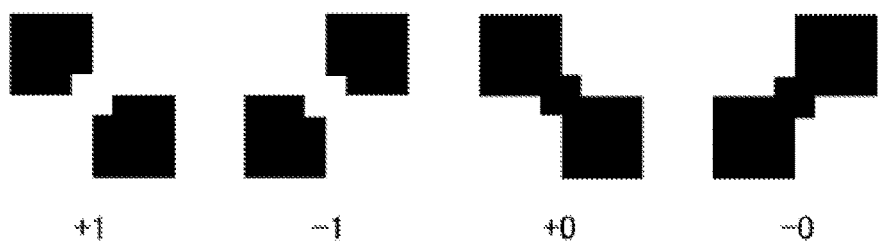

FIG. 4A   EXAMPLE OF "WORD" (4 × 4 PRIMITIVES)
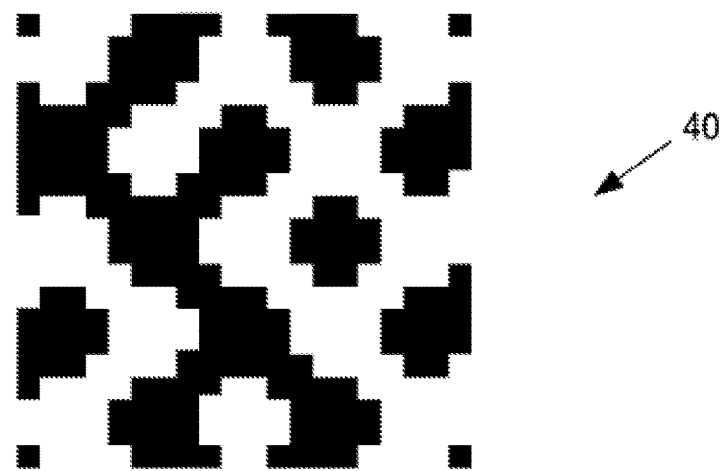
FIG. 4B   PRIMITIVES INCLUDED IN "WORD" (PORTION)
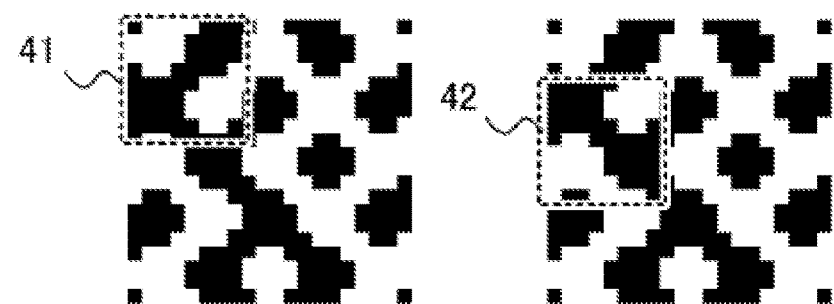
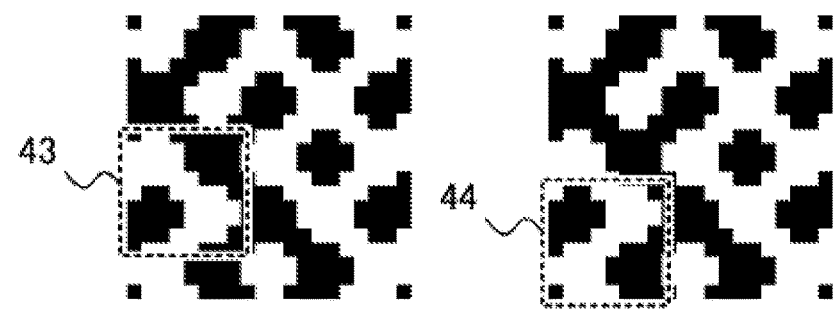

ENTIRE PATTERN CAN BE GENERATED BY GENERATING PATTERNS FOR N/2 COLUMNS

THREE-DIMENSIONAL MEASUREMENT APPARATUS AND THREE-DIMENSIONAL MEASUREMENT METHOD

CROSS REFERENCE TO RELATED APPLICATIONS

This application is a continuation application of International Application No. PCT/JP2017/034218, filed on Sep. 22, 2017, which claims priority based on the Article 8 of Patent Cooperation Treaty from prior Japanese Patent Application No. 2016-202682, filed on Oct. 14, 2016, the entire contents of which are incorporated herein by reference.

TECHNICAL FIELD

The disclosure relates to a three-dimensional measurement technology for measuring a three-dimensional position of a measurement target by projecting patterned light onto it.

BACKGROUND ART

As a technique for measuring a three-dimensional shape of a measurement target, active measurement is known. In active measurement, a measurement target is captured in a state where patterned light is projected onto it, and the three-dimensional shape (three-dimensional position of each pixel) of the measurement target is obtained from the position of the pattern on the captured image using the principle of triangulation.

In active measurement, one-shot active measurement, which can measure a three-dimensional shape with only one image, is a particularly useful technique. The reason for this is that, firstly, real-time measuring is enabled because only one image is used, secondly, moving objects can also be measured, and thirdly, it is possible to perform measurement even when the camera moves (e.g., when the camera is attached to the hand of a robot).

One-shot active measurement can be roughly divided into two methods, that is, a ToF (Time-of-Flight) method and a method using structured light (patterned light). The ToF method is a method in which a distance is measured from an optical path length until the light emitted from the light emitting portion of a sensor reaches the light receiving portion. On the other hand, in the method using structured light, a measurement target is captured in a state where patterned light is projected onto it, and the three-dimensional shape of the measurement target is obtained from the position of the pattern on the captured image. In the present specification, a method using structured light is adopted. A method using structured light has the advantages of high precision (especially, at short distance), wide field of view, and low cost.

As one example of structured light, Patent Document 1 discloses a method using a random dot pattern. Non-Patent Document 2 presents a system using a pattern having a random structure. However, using a random dot poses the problem that the amount of computation required for template matching, which is the underlying algorithm, increases.

Also, Non-Patent Document 1 and Patent Document 2 disclose methods using spatially encoded patterned light. The two-dimensional patterns disclosed in Non-Patent Document 1 and Patent Document 2 have a structure in which pattern constitution elements called "primitives" are two-dimensionally laid out. A window including a plurality of primitives (e.g., a window that is constituted by 2×3 primitives) can be specified from the plurality of primitives included in the window. Accordingly, the three-dimensional position can be calculated by detecting the row of the primitives from the captured image.

RELATED ART DOCUMENT

Patent Document

Patent Document 1: JP 2004-212385A
Patent Document 2: U.S. Pat. No. 8,090,194

Non-Patent Document

Non-Patent Document 1: P. Vuylsteke and A. Oosterlinck, Range image acquisition with a single binary-encoded light pattern, IEEE Trans. Pattern Analysis and Machine Intelligence, Vol. 12, No. 2, pp. 148-164, 1990.
Non-Patent Document 2: Hiroshi Kawasaki, Hitoshi Masuyama, Ryusuke Sagawa and Ryo Furukawa, "Single Color One-shot Scan using Topology Information", Computer Vision ECCV 2012. Workshops and Demonstrations, DOI 10.1007/978-3-642-33885-4_49

SUMMARY OF THE INVENTION

One or more aspects have been made in view of the above circumstances, and one or more aspects may provide a more effective three-dimensional measurement method, which is a three-dimensional measurement method capable of performing three-dimensional measurement with one shot using structured light.

Means for Solving the Problems

One or more aspects may be a three-dimensional measurement apparatus configured to measure a three-dimensional shape of a measurement target, the apparatus includes: projecting means for projecting patterned light having a predetermined pattern onto the measurement target; capturing means for capturing the measurement target onto which the patterned light is projected; calculating means for calculating, from an image captured by the capturing means, a three-dimensional position of a target pixel in the captured image, wherein the predetermined pattern is two-fold rotational symmetrical. In other words, the predetermined pattern is equal to the original pattern when rotated by 180° about its center.

Setting the pattern of the patterned light as mentioned above has the advantage that the projecting unit can be configured using a diffractive optical element (DOE), in addition to the effect that existing active three-dimensional measurement can be performed. The projecting unit does not necessarily need to be configured using a DOE, and may also be configured using a mask, for example. It is an advantageous effect that the flexibility of the design of the projecting unit is improved.

In one or more aspects, the predetermined pattern is a pattern in which a predetermined element pattern is repeated in the column direction for each column. The element pattern in the k-th column from one end can be equal to a pattern obtained by rotating the element pattern in the k-th column from the other end by 180°. In other words, when the pattern has N columns (where N is an integer), the element pattern in the k-th column from the one end and the element pattern in the (N−k+1)-th column have a relationship where they are rotated by 180° from each other. Alternatively, it can be understood that the entire pattern in the k-th column and the entire pattern in the (N−k+1)-th column has a relationship where they are rotated by 180° from each other. If the pattern is constituted in this manner, the entire pattern has a two-fold rotational symmetrical pattern.

In this case, it may be preferable that the element patterns of the column are different from each other. If the element patterns are different for each column, it is possible to uniquely specify a column from the pattern. Note, that even if some column has the same pattern as that of another column, it is possible to specify the column by also considering the patterns of the adjacent columns.

Another example of the predetermined pattern in one or more aspects is a pattern in which a predetermined element pattern is repeated in the upper half of the pattern in the column direction, and the lower half of the pattern is equal to a pattern obtained by rotating the entire upper half pattern by 180°. Also in this manner, the entire predetermined pattern has a two-fold rotational symmetrical pattern.

In one or more aspects, the calculating means can calculate the three-dimensional position of the calculation target pixel, as a point where a plane obtained from the pattern of the patterned light in a target pixel whose three-dimensional position is to be calculated intersects with a straight line obtained from the pixel position of the calculation target pixel.

Note that one or more aspects may be a three-dimensional measurement apparatus that includes at least part of the above means. Note that one or more aspects may be a three-dimensional measurement method that includes at least part of processes performed by the above-mentioned means. Also, one or more aspects may be a computer program for causing a computer to execute each step of the method, or a computer readable storage medium on which the program is stored in a non-transitory manner. One or more aspects can be configured by combining the above-mentioned configurations and the processes with each other unless no technical inconsistency occurs.

Effects of the Invention

According to one or more aspects, a three-dimensional measurement that is more effective than before can be achieved.

BRIEF DESCRIPTION OF THE DRAWINGS

FIGS. 3A to 3D are diagrams illustrating an encoding method of patterned light in one or more embodiments.

FIGS. 4A and 4B are diagrams illustrating an encoding method of patterned light in one or more embodiments.

EMBODIMENTS OF THE INVENTION

Hereinafter, embodiments will be described with reference to the figures. A three-dimensional measurement system according to one or more embodiments captures a measurement target by projecting patterned light onto it, and measures the three-dimensional shape of the measurement target using the principle of triangulation.

Outline

Figure 1A:
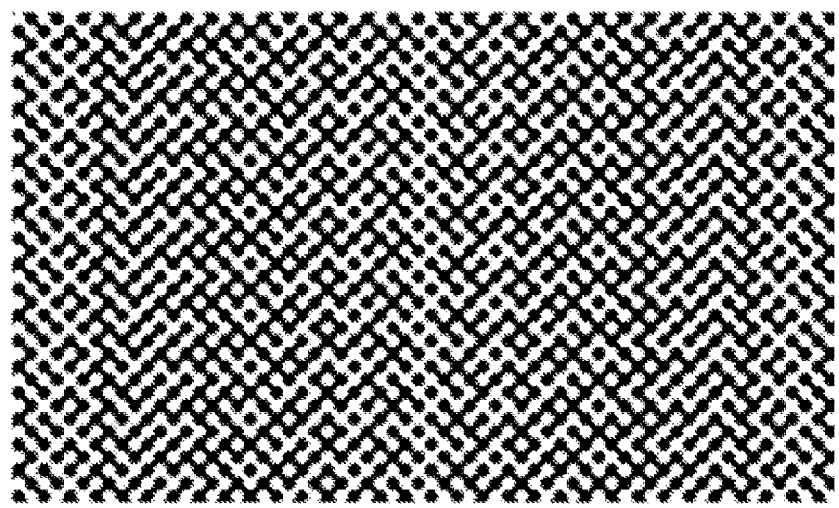
FIG. 1A is a diagram illustrating an example of entire patterned light in one or more embodiments.

FIG. 1A is a diagram showing an example of the entire patterned light that is projected in one or more embodiments. This figure shows that the entire patterned light has periodicity in the vertical direction, and is a two-fold symmetrical pattern.

Figure 1B:
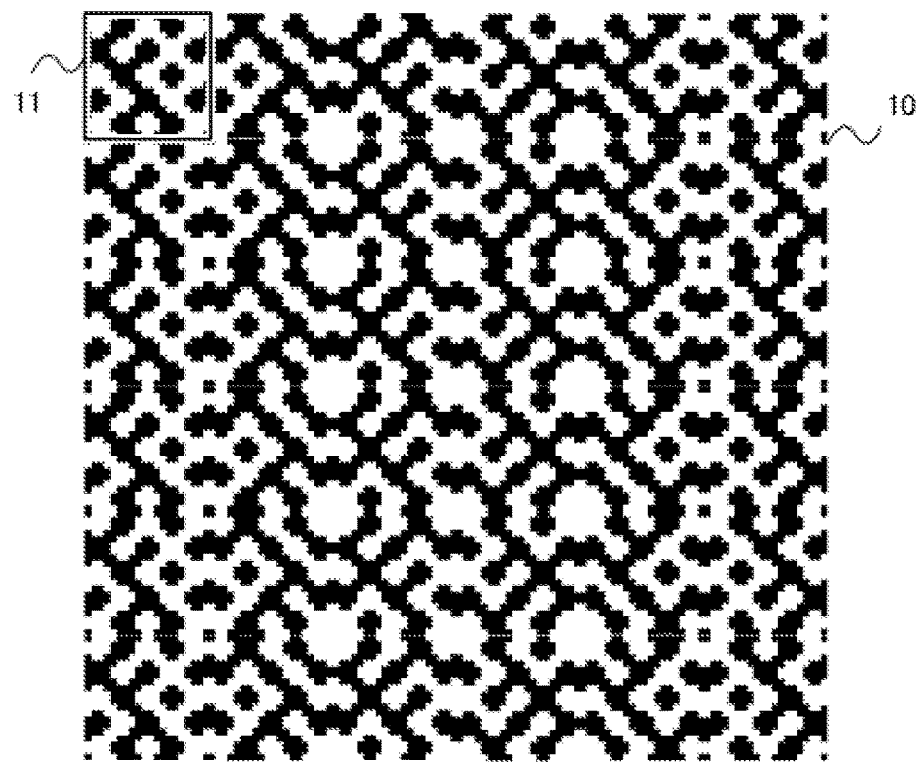
FIG. 1B is a diagram illustrating an example of patterned light in one or more embodiments.
Figure 1C:
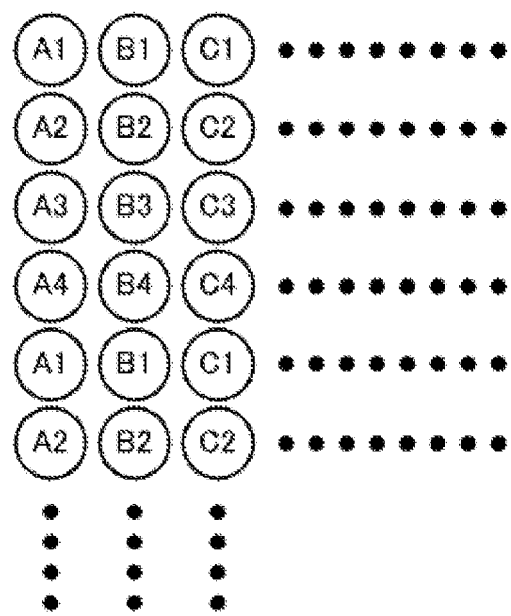
FIG. 1C is a diagram illustrating an example of patterned light in one or more embodiments.

FIG. 1B is a diagram showing an example of a repeated unit of the entire patterned light that is projected in one or more embodiments. Patterned light 10 is subjected to a predetermined encoding (the details will be described later), and can be considered as a two-dimensional array of codes as shown in FIG. 1C. The patterned light 10 has a code string peculiar to each column. Accordingly, it is possible to determine which column of the patterned light each pixel of the image corresponds to, by analyzing an image in which a measurement target, onto which the patterned light is projected, is captured. More specifically, the pixels are processed in units of primitives.

Figure 2:
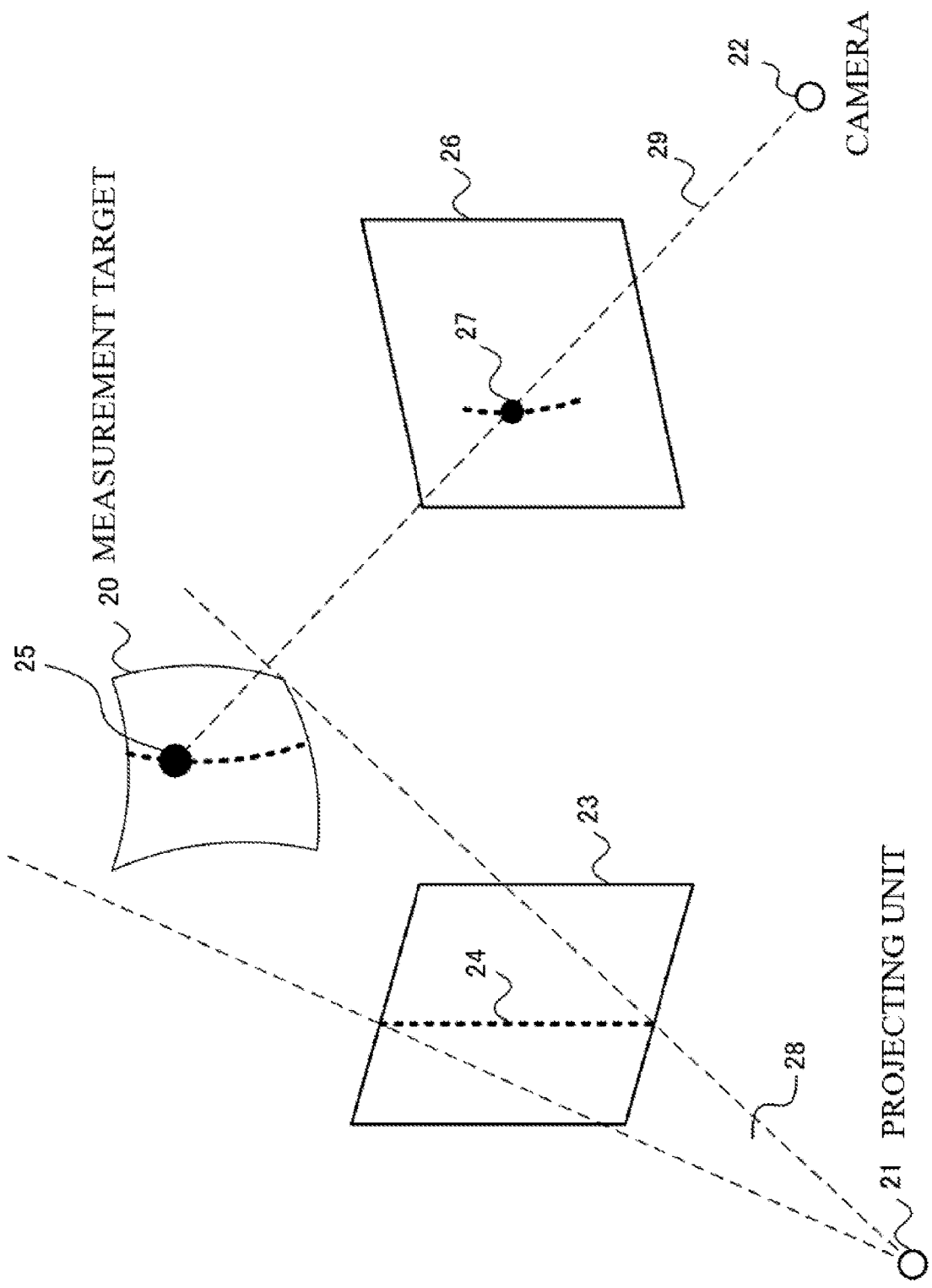
FIG. 2 is a diagram illustrating a principle of calculating a three-dimensional position.

FIG. 2 is a diagram illustrating the principle of a three-dimensional measurement in one or more embodiments. FIG. 2 shows that patterned light 23 is projected onto a measurement target 20 from a projecting unit 21 and a camera 22 captures the measurement target 20 onto which the patterned light is projected. Here, by examining the projection pattern (code) around the distance-measurement target pixel 27 of a captured image 26, it is possible to determine which column's patterned light is the patterned light projected on the pixel 27. In this case, it is assumed that a column 24 is projected on the pixel 27. Then, the three-dimensional position of a point 25 of the measurement target 20 that is projected on the pixel 27 can be obtained as a point where a plane 28 including the projecting unit 21 and the column 24 intersects with a straight line 29 connecting the camera 22 and the pixel 27.

Coding Method

Next, the coding method of the patterned light in one or more embodiments will be described. The patterned light in one or more embodiments has a two-dimensionally coded pattern. Specifically, one code term is constituted by a "word" in which a predetermined number of "primitives" (basic patterns) are two-dimensionally arranged. Each "primitive" is configured by bright and dark binaries, and has a finite number of types. The two-dimensionally coded pattern includes plural kinds of "words". Each "word" has a different two-dimensional structure, and thus "words" can be distinguished from each other.

FIG. 3A is a diagram illustrating an element called "primitive". A primitive 30 is constituted by a "bit" 31 that is one small rectangle and is positioned in the center, and "grids" 32 to 35 that are four larger rectangles and are arranged to surround the "bit" 31. One primitive has four possible values as shown in FIG. 3D, depending on the combination of the presence or absence of light irradiation on the bit and the grids.

Note, that in FIG. 3A, although the bit is present not only at the center but also at its surroundings, bits that are present at the surroundings are not illustrated. This is because the value of the primitive is determined only by the bit that is present at the center.

First, as shown in FIG. 3B, depending on the presence or absence of light irradiation on the bit 31, the value (absolute value) of the primitive 30 is determined to be (set to) "0" or "1". Note, that in this case, a black rectangle shows that light is irradiated on the bit 31, and a white rectangle shows that no light is irradiated on the bit 31, but this may also be reversed.

Next, as shown in FIG. 3C, the sign of the primitive 30 is determined to be (set to) "plus" or "minus", depending on the combination of grids 32 to 35. The patterns of plus and minus may also be reversed.

Thus, as shown in FIG. 3D, the primitive 30 may take four values of "+1", "−1", "+0", and "−0", depending on the combination of the bit 31 and the grids 32 to 35.

FIG. 4A is a diagram illustrating a "word" constituted by multiple primitives. Here, an example is shown, in which one word is constituted by four rows and four columns of primitives, but the number of primitives constituting one word may be determined as appropriate. 3×3 or 2×4 primitives may also be regarded as one word, for example.

FIG. 4B shows some of the primitives included in a word 40. The word 40 includes 5×5 grids. Here, the primitives included in the word 40 can be obtained by shifting the range of 2×2 grids (one primitive) by one grid at a time. Accordingly, as shown in FIG. 4B, the leftmost column of the word 40 includes four primitives 41 to 44. Each row is similarly constituted by four primitives, and thus the word 40 is constituted by 16 primitives. That is to say, one word is associated with codes constituted by 16 primitives.

In the pattern 10 shown in FIG. 1B, words 11 are arranged to be repeated in the column direction. Here, the word 11 is constituted by 4×4 primitives.

At first glance, the leftmost column of the pattern 10 is constituted only by the words 11. But, actually another word can be obtained by shifting the word 11 downward by one primitive. By shifting the word 11 in the same way, as shown in FIG. 1C, four words "A1", "A2", "A3", and "A4" can be obtained in the leftmost column in the FIG. 1B. The same word as the first word 11 is obtained by shifting the word 11 by four primitives from the initial position. Accordingly, four words "A1", "A2", "A3", and "A4" are repeatedly included. For the row direction as well, a word is obtained each time the word 11 is shifted by one primitive. Thus, adjacent words overlap each other.

First Design Method of Pattern

In one or more embodiments, a two-fold symmetrical pattern is adopted as patterned light. The design method of the pattern will be described with reference to FIGS. 5A and 5B.

Hereinafter, a pattern is designed by arranging an "element pattern", which is part of the pattern. In this case, it is assumed that a pattern having the same size as one word is used as an element pattern. However, the element pattern is not necessarily a unit of one word, and it may also be a pattern larger than one word.

Figure 5A:
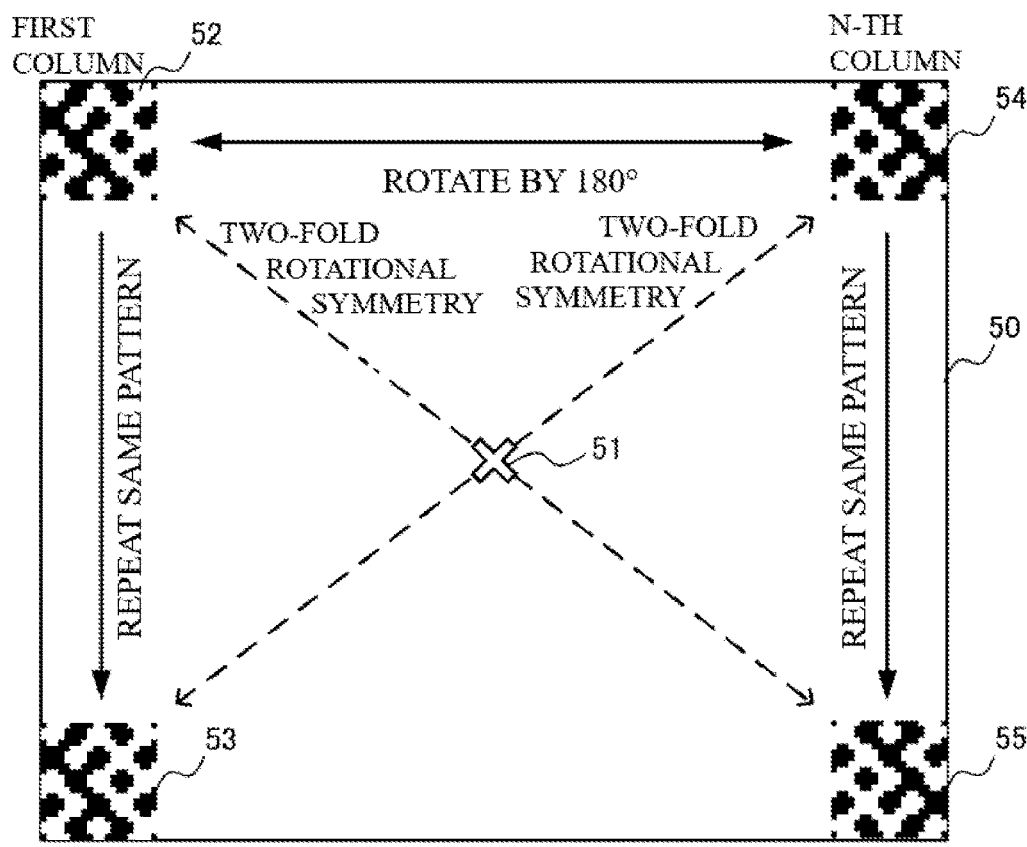
FIGS. 5A and 5B are diagrams illustrating an example of a structure and design method of patterned light in one or more embodiments.

In FIG. 5A, the same element pattern is repeatedly arranged in the leftmost column (the first column) of a pattern 50. Thus, an element pattern 52 arranged at the uppermost position in the first column and an element pattern 53 arranged at the lowermost position in the first column have the same pattern. Next, an element pattern, which is obtained by rotating the element pattern 52 arranged at the first column by 180°, is repeatedly arranged in the rightmost column. Accordingly, an element pattern 54 arranged at the uppermost position in the rightmost column and an element pattern 55 arranged at the lowermost position in the rightmost column are a pattern obtained by rotating the element pattern 52 by 180°.

Figure 5B:
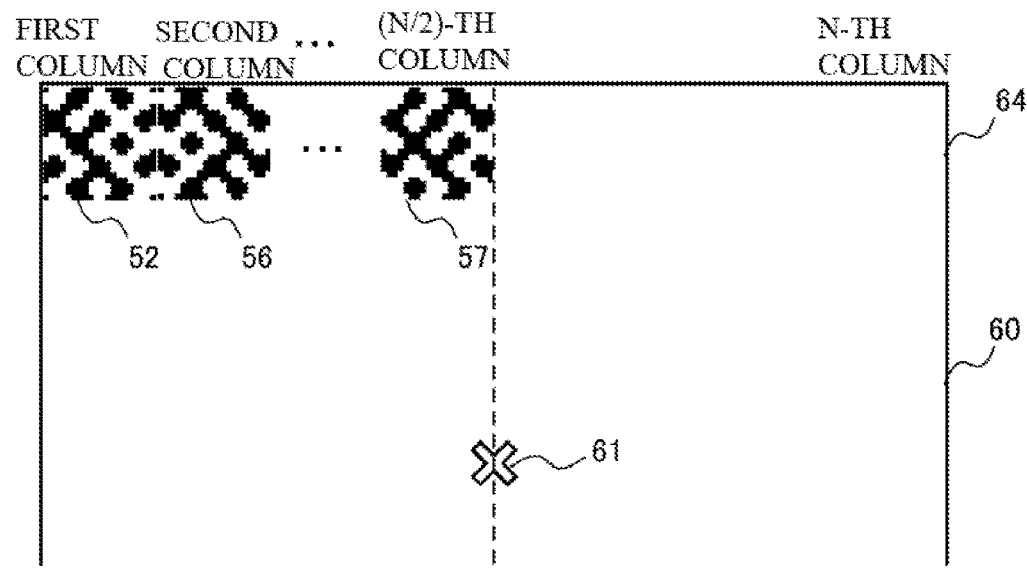

In this example, generally, the pattern is designed such that the element pattern in the k-th column from the left is the same as the element pattern obtained by rotating the element pattern in the k-th column from the right ((N−k+1)-th column from the left) by 180°. Also, each column is constituted by repeatedly arranging the same element pattern. Accordingly, as shown in FIG. 5B, the entire pattern 50 can be designed by arranging the element patterns 52, 56, . . . , 57 from the first column to the (N/2)-th column.

The pattern 50 that is designed in this manner becomes the same pattern when rotated by 180° with respect to the center 51. That is to say, the pattern 50 is a two-fold symmetrical pattern with respect to the center 51. Note, that "column" in this description and in FIGS. 5A and 5B means a column of an element pattern. Accordingly, if the entire pattern 50 is constituted by element patterns of N columns, and each element pattern is constituted by primitives of M columns, the entire pattern 50 has primitives or words of approximately N×M columns (exactly N×(M−1)+1 columns).

Considering these columns of word units, it is apparent from the above design method that a word in the k-th column (word column) from the left is the same word as a word obtained by rotating a word in the k-th column (word column) from the right by 180°.

Note, that it is preferable that the element patterns of the columns included in the pattern 50 are different from each other. To satisfy this condition, it is preferable that the element patterns 52, 56, . . . , 57 are not only different from each other, but also different from the element patterns obtained by rotating the element patterns 52, 56, . . . , 57 by 180°. This is because, if element patterns are different from each other, words included in word columns are different from each other, so that a column can be specified from one column of words. Note, that strictly speaking, the above-mentioned condition does not necessarily have to be satisfied, because the column can also be specified by examining a combination of words including words in adjacent columns even if some column is constituted by the same word as another column. Therefore, it is sufficient that an arrangement pattern of words of a plurality of adjacent columns (e.g., three columns, five columns, etc.) is different from a pattern of another plurality of columns.

Second Design Method of Pattern

Figure 6A:
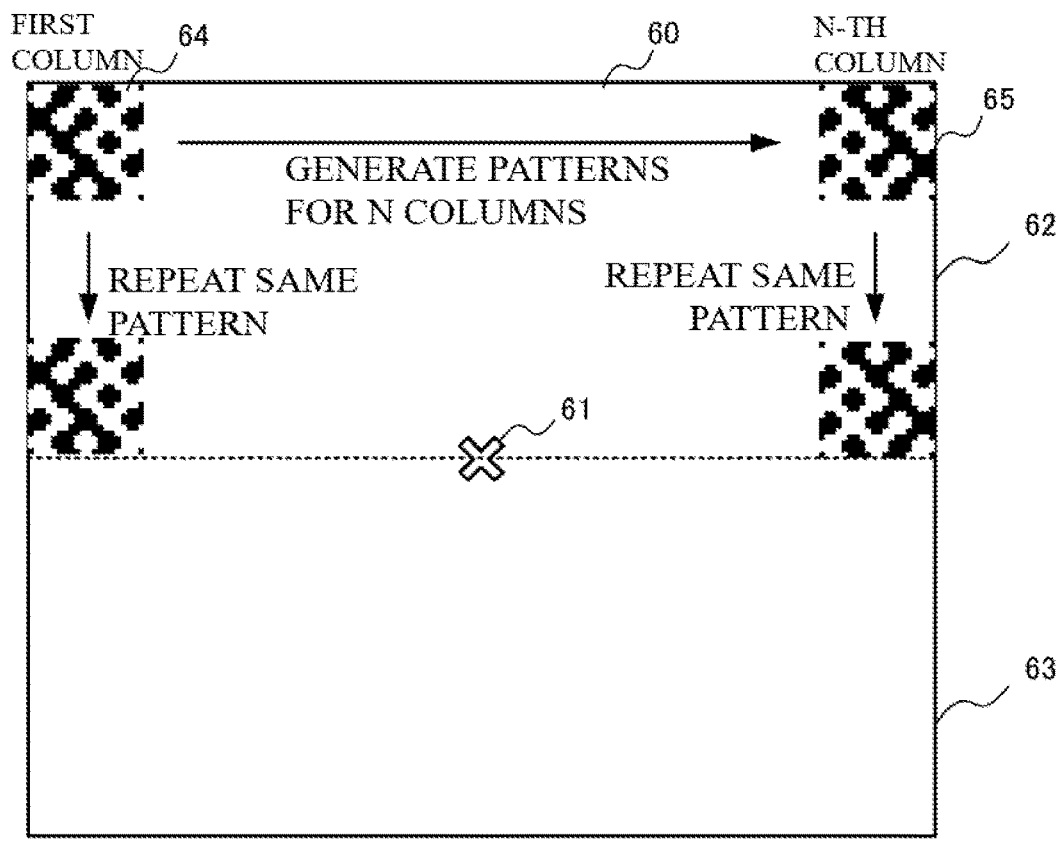
FIGS. 6A and 6B are diagrams illustrating another example of a structure and design method of patterned light in one or more embodiments.

A design method of the pattern, which is different from the above-mentioned method, will be described with reference to FIGS. 6A and 6B. In this example, as shown in FIG. 6A, first, the pattern of an upper half region (upper region) 62 of a pattern 60 is designed. In the upper region 62, each column is constituted by arranging the same element pattern. The element patterns (64, 65, etc.) are determined for all columns of the upper region 62. Then, the pattern of the upper region 62 can be determined by repeating these element patterns in the column direction.

Figure 6B:
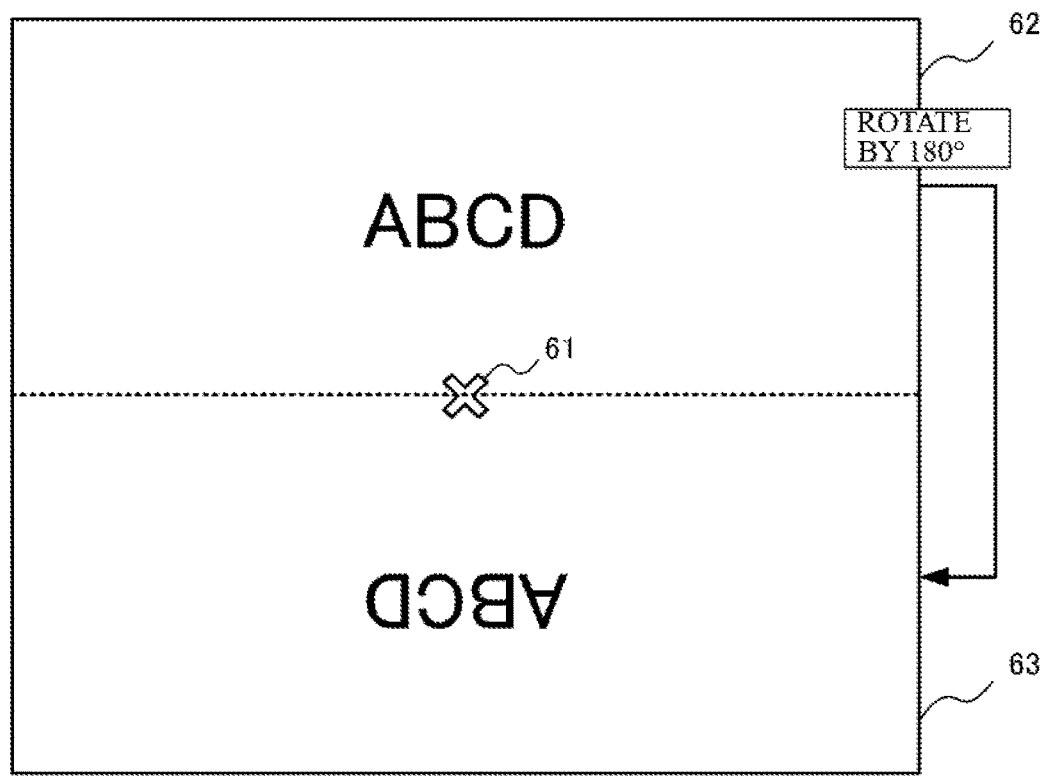

Next, as shown in FIG. 6B, the pattern of a lower half region (lower region) 63 is determined by rotating the upper region 62 by 180°.

The pattern 60 that is designed in this manner becomes the same pattern when rotated by 180° with respect to the center

61. That is to say, the pattern 60 is a two-fold symmetrical pattern with respect to the center 61.

In this example, words included in one column are different between the upper region 62 and the lower region 63. Accordingly, there may be a case in which it is not possible to specify a column from one column of words in a captured image. Specifically, assume a case in which a word X is present in the column i and a word Y is present in the column j, and the word Y becomes the same word as the word X when inverted. In this case, even if the word X is detected from an image, it is not possible to determine whether the word X is the word in the column i or the word in the column j. Also, assume a case in which the word X, which becomes the same word as some word when inverted, is present in the column k. In this case, even if the word X is detected from an image, it is impossible to determine whether the word X is included in the column k or in the column N-k (where N is the number of columns of the entire pattern). However, it is possible to specify a column by also examining the adjacent words.

Also in this example, it is preferable that the element patterns of the columns in the upper region are different from each other. Note, that strictly speaking, this condition does not necessarily have to be satisfied, because the column can also be specified by examining the words in the adjacent columns even if some column is constituted by the same words as another column.

Considerations in Pattern Design

Although not described in detail above, it is desirable to design each element pattern so that a word including a boundary of the element patterns becomes a valid word. That is to say, it is desirable to determine the element pattern of each column so that the boundary portion formed when the element patterns are arranged in the column direction becomes a valid word. In addition, it is desirable to determine the element pattern of each column so that the boundary portion between the element patterns of the two adjacent columns also becomes a valid word. Furthermore, in the second method mentioned above, it is desirable to determine the element pattern of each column so that the boundary portion between the upper region 62 and the lower region 63 also becomes a valid word. Note, that "valid" means that, for example, the words in the pattern are different from each other, or the combinations of the words including the words of the adjacent columns are different from each other.

The above-mentioned design methods of the pattern are examples. Any pattern may be adopted as long as the pattern is two-fold symmetrical, and also the design method of the pattern is not particularly limited. As the first method, for example, a design method may also be adopted in which the left half region is designed, and then the right half region is designed as the pattern obtained by rotating the left half region by 180°.

In the above description, it is assumed that the entire pattern is designed by arranging a plurality of "element patterns" in the row direction, but the design method according to one or more embodiments is not limited to this. As shown below, a method may be considered, in which a pattern is increased in the row direction by one primitive at a time.

1. First, arrange one word on the leftmost row.
2. Add one column of "primitives" to the right of that row.
3. Confirm whether there is no identical word in the entire row. If an identical word is included, perform 2 again using another primitive.

Step 4. Repeat 2 and 3. The method is completed when the arrangement reaches the rightmost row.

Here, a case is exemplified in which the arrangement is started from the leftmost row, but the arrangement may also be started from the rightmost row toward the left, or started from the center toward the both side rows. Also, it is confirmed whether an identical word is included each time one row of primitives is added, but it may also be confirmed whether an identical word is included each time plural columns of primitives are added.

System Configuration

Figure 7:
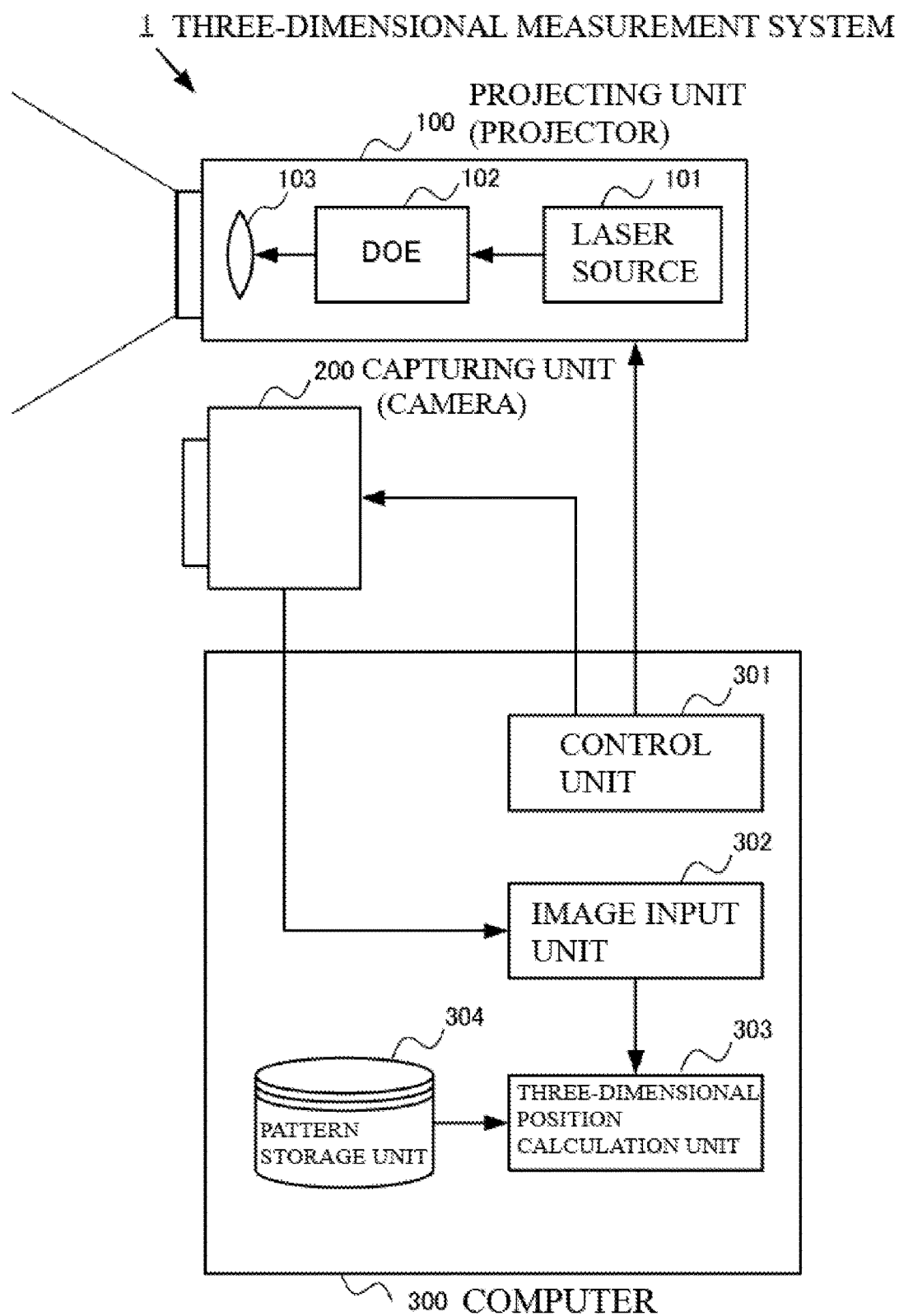
FIG. 7 is a diagram illustrating a system configuration of a three-dimensional measurement system according to one or more embodiments.

FIG. 7 is a diagram showing the system configuration of the three-dimensional measurement system according to one or more embodiments. The three-dimensional measurement system is configured by a projecting unit (projector) 100, a capturing unit (camera) 200, and a computer 300.

The projecting unit 100 is an apparatus for projecting patterned light having a two-fold symmetrical pattern. In one or more embodiments, the projecting unit 100 is configured by a laser source 101, a diffractive optical element (DOE) 102, and a lens 103. The surface of the DOE 102 is finely structured, so that if a laser beam is incident on the DOE 102, a two-dimensionally coded pattern is emitted.

The wavelength of the laser beam generated by the laser source 101 is not particularly limited. Light such as infrared light, visible light, and ultraviolet light may be used.

In general, the DOE 102 can easily generate a two-fold symmetrical pattern, but cannot easily generate other patterns. Accordingly, by using a two-fold symmetrical pattern as in one or more embodiments, the projecting unit 100 using a DOE can be easily installed.

Note, that the patterned light is not necessarily generated by a DOE. Patterned light may also be generated using a mask, for example.

The capturing unit (camera) 200 captures an object onto which the patterned light from the projecting unit 100 is projected. Accordingly, it is necessary for the imaging element of the capturing unit 200 to be able to detect the wavelength of the patterned light projected by the projecting unit 100. The positions of the projecting unit 100 and the capturing unit 200 are adjusted so that part or all of the projected patterned light is reflected in the field of view of the capturing unit 200. An image captured by the capturing unit 200 is input to the computer 300.

The computer 300 controls the projecting unit 100 and the capturing unit 200, and calculates the three-dimensional position from an image in which a measurement target onto which the patterned light is projected is captured. The computer 300 is configured as a general purpose computer (information processing apparatus) that includes a processor (arithmetic processing unit) such as a CPU (Central Processing Unit) or an MPU (Micro Processing Unit), a main storage apparatus such as a RAM (Random Access Memory), an auxiliary storage apparatus such as a semiconductor memory, a magnetic disk, an optical disk, or a magneto-optical disk, an input apparatus such as a keyboard, various kinds of pointing devices (e.g., a mouse, a touch pad, a touch panel, or a pen tablet), and a microphone, an output apparatus such as a display apparatus (e.g., a liquid crystal display, a CRT display, or a projector) and an audio output apparatus, and a communication apparatus for performing wired communication and wireless communication. The computer 300 provides the following functions by the processor deployed on the main storage apparatus executing computer programs stored in the auxiliary storage apparatus. Note, that some or all of the following functions may also be realized using an ASIC (Application Specific Integrated Circuit), an FPGA (Field Programmable Gate Array), a DSP (Digital Signal Processor), or the like. In addition, the computer 300 is not necessarily configured as a single apparatus, and a plurality of computers may also cooperate to provide these functions.

As its function units, the computer 300 includes a control unit 301, an image input unit 302, a three-dimensional position calculation unit 303, and a pattern storage unit 304.

The control unit 301 controls the entire processes of the three-dimensional measurement system 1, and particularly controls the projection of the patterned light by the projecting unit 100, the capturing by the capturing unit 200, and the three-dimensional measurement based on a captured image.

The image input unit 302 receives an image captured by the capturing unit 200, and stores the received image in the memory as image data.

The three-dimensional position calculation unit 303 selects the target pixel whose three-dimensional position is to be calculated from a captured image. Then, for each of the selected pixels, the three-dimensional position calculation unit 303 specifies a code (word) of the patterned light that is projected on that pixel, that is, specifies the column (word column) in the pattern, and calculates the three-dimensional position based on the column and the pixel position. Because the pattern of the patterned light that is projected by the projecting unit 100 is stored in the pattern storage unit 304, the three-dimensional position calculation unit 303 can specify the column in the pattern from the code (word) of the patterned light in the image. Also, the three-dimensional position calculation unit 303 holds the relationship between the installation positions of the projecting unit 100 and the capturing unit 200. Accordingly, the point where the plane including a column specified as the projecting unit 100 intersects with the straight line connecting the capturing unit 200 and the target pixel can be obtained as the three-dimensional position of the target pixel.

Processes

Figure 8:
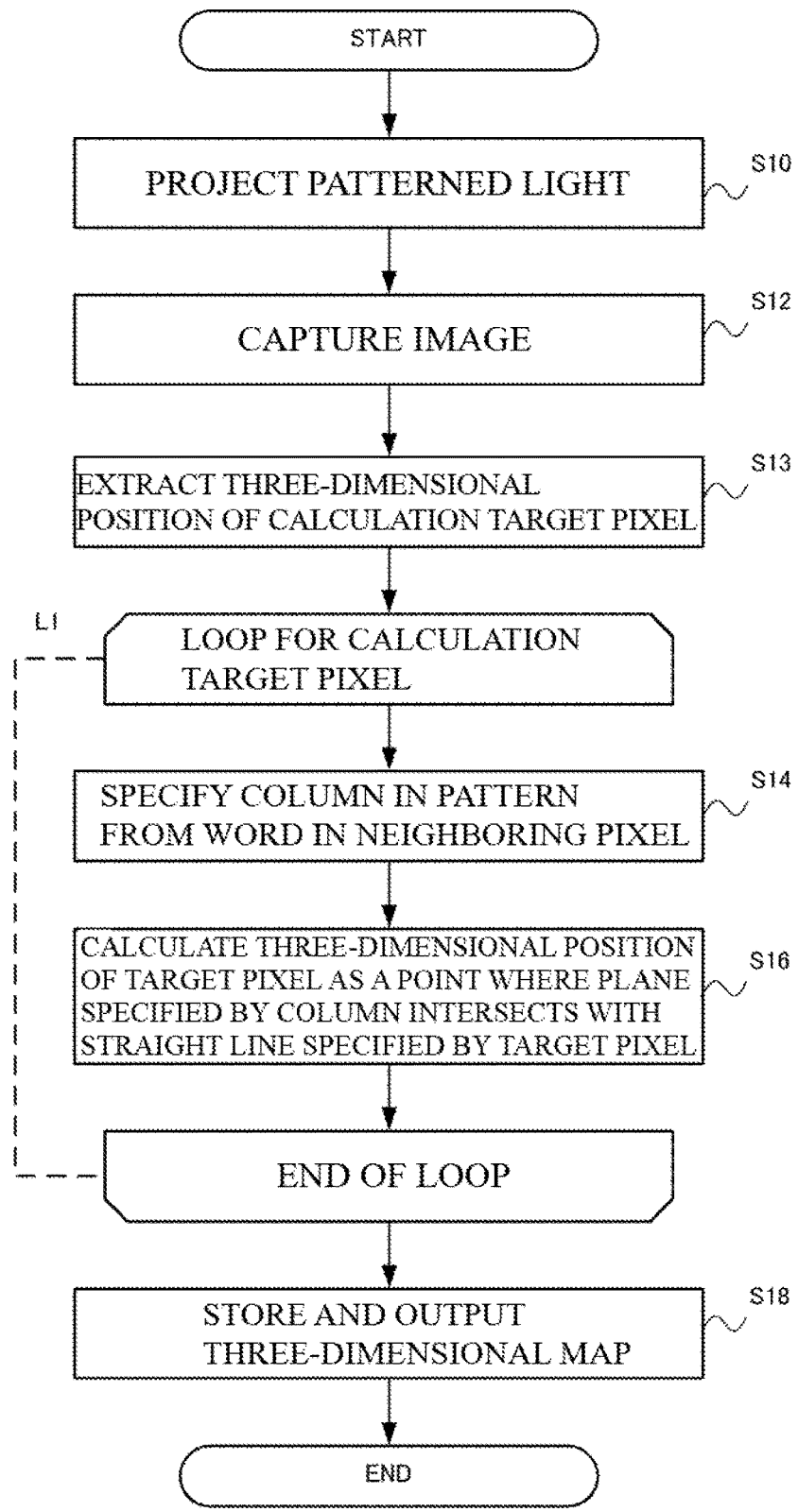
FIG. 8 is a flow diagram illustrating a flow of processes in a three-dimensional measurement system according to one or more embodiments.

The processes performed by the three-dimensional measurement system 1 according to one or more embodiments will be described with reference to FIG. 8. In step 10, the control unit 301 controls the projecting unit 100 to project the patterned light onto the measurement target. In step 12, the control unit 301 controls the capturing unit 200 to capture an image of the measurement target onto which the patterned light is projected, and imports the captured image from the image input unit 302.

In step S13, the three-dimensional position calculation unit 303 extracts a pixel whose three-dimensional position is to be calculated from the captured image through image processing. Specifically, the three-dimensional position calculation unit 303 extracts primitives from the captured image, and obtains information on the center coordinates of the primitives, the signs of the primitives, and the adjacency relationship between the primitives. The region to be subjected to the image processing may be all pixels in the captured image, but may also be the pixels included in a part of the region.

A loop L1 from step S14 to step S16 is performed for each of the obtained calculation target pixels. In step S14, the three-dimensional position calculation unit 303 specifies a column in the pattern from the pattern of the word that is constituted by the primitives corresponding to the calculation target pixel.

In step S16, the three-dimensional position calculation unit 303 calculates the three-dimensional position (the position in real space) of the object in which the target pixel is captured, as a point where the plane specified by the column of the pattern and the projecting unit 100 intersects with the straight line specified by the position of the target pixel (position in the image) and the capturing unit 200.

When the three-dimensional positions of the all distance-measurement target pixels are calculated, in step S18, the three-dimensional map is stored in the memory or is output to an external apparatus.

Advantageous Effects of Embodiment

According to one or more embodiments, active three-dimensional measurement can be performed with one shot. Accordingly, compared with a TOF method, the method according to one or more embodiments has the advantages of high precision (especially, at short distance), wide field of view, and low cost. Furthermore, because the patterned light is a two-fold symmetrical pattern, the projecting apparatus can be realized using a diffractive optical element (DOE), in addition to realizing the projecting apparatus using a mask. Accordingly, the flexibility of the configuration of the projecting apparatus increases. In order to project a two-fold symmetrical pattern, particularly, a binary diffractive optical element can be used as a diffractive optical element. Because a binary diffractive optical element is easy to design and can be manufactured at a low cost, it is suitable in the practice of one or more embodiments.

Variation

The descriptions of the above embodiments and the variations are merely examples for explaining one or more embodiments, and is not intended to limit the present invention to the scope of the disclosure. In addition, the element technologies described in the above embodiments and the variations can be combined with each other to the extent that there are no technical inconsistencies to implement one or more embodiments.

The two-dimensionally coded patterned light applicable in one or more embodiments is not limited to the above-mentioned two-dimensionally coded patterned light, for example. The coding method shown in FIGS. 3A to 3D, 4A, and 4B is merely an example, and other known spatial coding methods of two-dimensional coding methods may be adopted. Examples include two-dimensional grid indexing, grid indexing using pseudo random binary arrays, and grid indexing using multi-valued pseudo random arrays.

Also, in the calculation of the three-dimensional position, the three-dimensional position is calculated as a point where the plane obtained from the column of the pattern intersects with the straight line obtained from the pixel position. But, the three-dimensional position may also be obtained using an epipolar constraint. That is to say, in the corresponding column of the pattern, the row is further specified by an epipolar constraint, and the three-dimensional position may also be calculated as a point where the straight line obtained from the primitive that is obtained as only one primitive in the pattern intersects with the straight line obtained from the pixel position.

In the above embodiments, the final output is a three-dimensional map that is obtained from patterned light, but the final output may also be obtained by further performing a correction process such as smoothing or interpolating for the three-dimensional map. Also, the three-dimensional position is obtained by targeting one captured image, but the three-dimensional measurement of a moving object can be achieved by performing similar processing on each frame of a moving image.

INDEX TO THE REFERENCE NUMERALS

1 . . . three-dimensional measurement system
100 . . . projecting unit (projector)

101 . . . laser source
102 . . . diffractive optical element (DOE)
103 . . . lens
200 . . . capturing unit (camera)
300 . . . computer
301 . . . control unit
302 . . . image input unit
303 . . . three-dimensional position calculation unit
304 . . . pattern storage unit

The invention claimed is:

1. A three-dimensional measurement apparatus configured to measure a three-dimensional shape of a measurement target, the apparatus comprising:
a projector configured to project, onto the measurement target, patterned light comprising a two-dimensionally coded pattern in which a plurality of types of words, each comprising a different two-dimensional structure and being distinguishable from each other, is two-dimensionally arranged;
a camera configured to capture an image of the measurement target onto which the patterned light is projected; and
a processor configured with a program to perform operations comprising extracting a word from the image captured by the camera and calculating a three-dimensional position of a target pixel of the image based on the extracted word, wherein
the two-dimensionally coded pattern is two-fold symmetrical,
the two-dimensionally coded pattern comprises a pattern in which a predetermined word is repeated in a column direction for each of a plurality of columns of the two-dimensionally coded pattern,
a word in a k-th column from one end of the two-dimensionally coded pattern is equal to a word obtained by rotating a word in a k-th column from the other end of the two-dimensionally coded pattern by 180°, and
in the two-dimensionally coded pattern, one type of word appears only once in one row such that a column is specified by the extracted word.

2. The three-dimensional measurement apparatus according to claim 1, wherein
each of the plurality of types of words is equal to an other one of the plurality of types of words rotated by 180°.

3. The three-dimensional measurement apparatus according to claim 1, wherein
in an upper half of the two-dimensionally coded pattern, a predetermined word is repeated in a column direction, and
a lower half of the two-dimensionally coded pattern is equal to a pattern obtained by rotating the pattern of the upper half by 180°.

4. The three-dimensional measurement apparatus according to claim 1, wherein
the processor is configured with the program to perform operations further comprising calculating, for a word extracted from the captured image, the three-dimensional position as a point where a straight line in space determined from a position in the captured image intersects with a plane in space determined from a column in the two-dimensionally coded pattern that is specified by the word.

5. The three-dimensional measurement apparatus according to claim 4, wherein
the processor is configured with the program to perform operations further comprising specifying calculating, in the image, a word in which the target pixel is comprised using the target pixel and a neighboring pixel of the target pixel, and calculating the three-dimensional position of the target pixel based on the word.

6. The three-dimensional measurement apparatus according to claim 1, wherein
the processor is configured with the program to perform operations further comprising calculating, for a word extracted from the captured image, the three-dimensional position as a point where a straight line in space determined from a position in the captured image intersects with a straight line in space determined from an intersection point of a column in the two-dimensionally coded pattern specified by the word and an epipolar line.

7. The three-dimensional measurement apparatus according to claim 1, wherein
the projector generates the patterned light using a diffractive optical element.

8. The three-dimensional measurement apparatus according to claim 7, wherein
the diffractive optical element comprises a binary diffractive optical element.

9. The three-dimensional measurement apparatus according to claim 2, wherein
in an upper half of the two-dimensionally coded pattern, a predetermined word is repeated in a column direction, and
a lower half of the two-dimensionally coded pattern is equal to a pattern obtained by rotating the pattern of the upper half by 180°.

10. The three-dimensional measurement apparatus according to claim 2, wherein
the processor is configured with the program to perform operations further comprising calculating, for a word extracted from the captured image, the three-dimensional position as a point where a straight line in space determined from a position in the captured image intersects with a plane in space determined from a column in the two-dimensionally coded pattern that is specified by the word.

11. The three-dimensional measurement apparatus according to claim 10, wherein
the processor is configured with the program to perform operations further comprising specifying, in the image, a word in which the target pixel is comprised using the target pixel and a neighboring pixel of the target pixel, and calculating the three-dimensional position of the target pixel based on the word.

12. The three-dimensional measurement apparatus according to claim 2, wherein
the processor is configured with the program to perform operations further comprising calculating, for a word extracted from the captured image, the three-dimensional position as a point where a straight line in space determined from a position in the captured image intersects with a straight line in space determined from an intersection point of a column in the two-dimensionally coded pattern specified by the word and an epipolar line.

13. The three-dimensional measurement apparatus according to claim 2, wherein
the projector generates the patterned light using a diffractive optical element.

14. A three-dimensional measurement method for measuring a three-dimensional shape of a measurement target, the method comprising:

projecting, onto the measurement target, patterned light a two-dimensionally coded pattern in which a plurality of types of words, each comprising a different two-dimensional structure and being distinguishable from each other, are two-dimensionally arranged;

capturing an image of the measurement target onto which the patterned light is projected; and extracting a word from the captured image, and of calculating a three-dimensional position of a target pixel of the image based on the extracted word, wherein the two-dimensionally coded pattern is two-fold symmetrical, the two-dimensionally coded pattern comprises a pattern in which a predetermined word is repeated in a column direction for each of a plurality of columns of the two-dimensionally coded pattern, a word in a k-th column from one end of the two-dimensionally coded pattern is equal to a word obtained by rotating a word in a k-th column from the other end of the two-dimensionally coded pattern by 180°, and in the two-dimensionally coded pattern, one type of word appears only once in one row such that a column is specified by the extracted word.

* * * * *